United States Patent
Zhang et al.

(10) Patent No.: US 8,938,163 B2
(45) Date of Patent: Jan. 20, 2015

(54) METHOD AND SYSTEM FOR HYBRID MULTI-LAYER MESH RESTORATION IN A COMMUNICATION NETWORK

(75) Inventors: Qiong Zhang, Plano, TX (US); Xi Wang, Murphy, TX (US); Paparao Palacharla, Richardson, TX (US); Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 402 days.

(21) Appl. No.: 13/348,915

(22) Filed: Jan. 12, 2012

(65) Prior Publication Data

US 2013/0089317 A1 Apr. 11, 2013

Related U.S. Application Data

(60) Provisional application No. 61/543,583, filed on Oct. 5, 2011.

(51) Int. Cl.
| | |
|---|---|
| *H04B 10/00* | (2013.01) |
| *H04J 14/00* | (2006.01) |
| *H04J 14/02* | (2006.01) |
| *H04Q 11/00* | (2006.01) |
| *H04L 12/24* | (2006.01) |

(52) U.S. Cl.
CPC ........ *H04Q 11/0062* (2013.01); *H04J 14/0284* (2013.01); *H04J 14/0295* (2013.01); *H04L 41/0654* (2013.01); *H04Q 2011/0081* (2013.01)
USPC ........ 398/2; 398/1; 398/69; 398/49; 370/216; 370/235

(58) Field of Classification Search
CPC .............. H04J 14/0227; H04J 14/0268; H04J 14/0267; H04Q 2011/0081
USPC .................................................. 398/1, 2, 57
See application file for complete search history.

(56) References Cited

U.S. PATENT DOCUMENTS

| | | | | |
|---|---|---|---|---|
| 6,728,484 | B1* | 4/2004 | Ghani .............................. | 398/42 |
| 7,672,586 | B2* | 3/2010 | Martin ............................ | 398/49 |
| 7,849,225 | B2* | 12/2010 | Schofield et al. ............. | 709/250 |

(Continued)

OTHER PUBLICATIONS

Shao [Differentiated Quality of Protection (QoP) and Cross Layer Protection for Survivable Hybrid Packet/WDM Networks, OSA/OFC/NFOEC 2009].*

(Continued)

*Primary Examiner* — Oommen Jacob
(74) *Attorney, Agent, or Firm* — Baker Botts L.L.P.

(57) ABSTRACT

In accordance with embodiments of the present disclosure, a method may include sorting potential optical layer link failures in a network in an increasing order of failed traffic amount. The method may further include, for each potential optical link failure in increasing order of failed traffic amount: determining the additional higher layer link capacity required on existing higher layer links associated with the potential optical link failure using higher layer restoration of the potential optical link failure; determining the additional optical layer capacity required for restoring the existing higher layer links associated with the potential optical link failure using optical layer restoration; and selecting one of the higher layer and the optical layer as a restoration layer for restoration of the existing higher layer links associated with the potential optical link failure based on the determined additional higher layer link capacity and the determined additional optical layer capacity.

21 Claims, 5 Drawing Sheets

(56) References Cited

U.S. PATENT DOCUMENTS

| | | | |
|---|---|---|---|
| 8,165,466 B2* | 4/2012 | Emery et al. | 398/30 |
| 2003/0020977 A1* | 1/2003 | Smith et al. | 359/110 |
| 2003/0138253 A1* | 7/2003 | Kim et al. | 398/69 |
| 2005/0063299 A1* | 3/2005 | Atkinson et al. | 370/216 |
| 2009/0003211 A1* | 1/2009 | Akyamac et al. | 370/235 |
| 2011/0182576 A1* | 7/2011 | Zhou et al. | 398/34 |
| 2013/0089317 A1* | 4/2013 | Zhang et al. | 398/2 |

OTHER PUBLICATIONS

Li [IP over Optical Cross-Connect Architectures, Topics in Optical Communication 2007].*

Chiu et al.; "Network design and architectures for Highly Dynamic Next-Generation IP-Over-Optical long distance networks"; Journal of Lightwave Technology, vol. 27, No. 12; pp. 1878-1890, Jun. 15, 2009.

Chiu et al.; "Integrated restoration for Next-Generation IP-Over-Optical-Networks"; IEEE; pp. 12, 2011.

Li et al.; "IP over Optical Cross-Connect Architectures"; IEEE Communications Magazine; Topics in Optical Communications; pp. 34-39, Feb. 2007.

Pacharintanakul et al.; "The effects of multi-layer traffic on the survivability of IP-Over-WDM networks"; IEEE ICC; pp. 6, 2009.

Chamania et al.; "Achieving IP routing stability with optical bypass"; Journal of Optical Switching and Networking; vol. 7, No. 4; pp. 173-184, 2010.

Xu et al.; "Differentiated quality of protection (QoP) and cross-layer protection for survivable hybrid packet/WDM networks"; OFC; pp. 3, 2009.

C. Chigan, et al., "Cost Effectiveness of Joint Multilayer Protection in Packet-Over-Optical Networks," Journal of Lightwave Technology, vol. 21, No. 11, pp. 11, Nov. 2003.

* cited by examiner

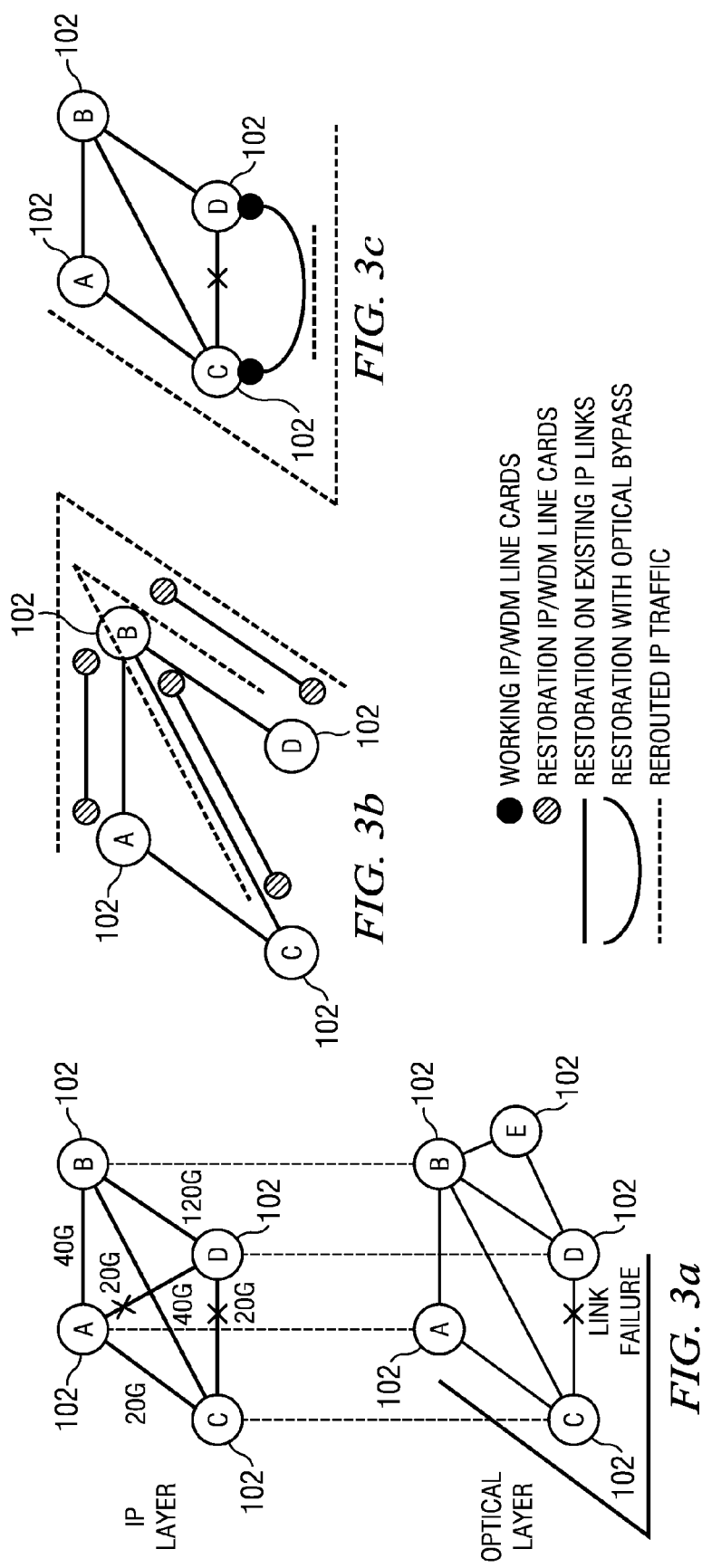

METHOD AND SYSTEM FOR HYBRID MULTI-LAYER MESH RESTORATION IN A COMMUNICATION NETWORK

CROSS-REFERENCE TO RELATED APPLICATIONS

This application claims the benefit of U.S. Provisional Application No. 61/543,583 filed on Oct. 5, 2011, entitled "*Hybrid Multi-Layer Mesh Restoration in Optical Networks,*" which is incorporated herein in its entirety.

TECHNICAL FIELD OF THE INVENTION

The present invention relates generally to communications networks and, more particularly, to a method and system for hybrid multi-layer mesh restoration in an optical communication network.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss.

In telecommunications, information is often sent, received, and processed according to the Open System Interconnection Reference Model (OSI Reference Model or OSI Model). In its most basic form, the OSI Model divides network architecture into seven layers which, from top to bottom, are the Application, Presentation, Session, Transport, Network, Data-Link, and Physical Layers, which are also known respectively as Layer 7 (L7), Layer 6 (L6), Layer 5 (L5), Layer 4 (L4), Layer 3 (L3), Layer 2 (L2), and Layer 1 (L1). It is therefore often referred to as the OSI Seven Layer Model.

Layer 1 is the layer which typically defines electrical and physical specifications for devices. In particular, Layer 1 may define the relationship between a device and a transmission medium, such as a copper or optical cable. This includes the layout of pins, voltages, cable specifications, hubs, repeaters, network adapters, host bus adapters (HBA used in storage area networks) and more. In optical networks, Layer 1 may also be referred to as the "optical layer."

Layer 2 is the layer which typically transfers data between adjacent network nodes in a wide area network or between nodes on the same local area network segment. Layer 2 provides the functional and procedural means to transfer data between network entities and might provide the means to detect and possibly correct errors that may occur in the Layer 1. Examples of Layer 2 protocols are Ethernet for local area networks (multi-node), the Point-to-Point Protocol (PPP), HDLC and ADCCP for point-to-point (dual-node) connections. Layer 2 data transfer may be handled by devices known as switches.

Layer 3 is responsible for end-to-end (source to destination) packet delivery including routing through intermediate hosts, whereas Layer 2 is responsible for carrying Layer 3 packets of payloads and enabling communication between Layer 3 entities. Perhaps the best known example of a Layer 3 protocol is Internet Protocol (IP) and accordingly, Layer 3 is often referred to as the "IP layer." Layer 3 data transfer may be handled by devices known as routers.

To ensure high reliability and availability in communications networks, including optical communications networks, redundancy is often built into such networks, so that if a fault occurs in a particular communications path, a redundant backup communication path may be utilized. In mesh networks, utilization of a backup path in response to a fault in a primary path may be referred to as "mesh restoration." Network failures can originate from many different sources at multiple network layers. One major challenge in network restoration design is to develop a cost-effective network architecture that can restore failures at any network layer.

Although optical layer restoration has been extensively researched, and the technology for optical layer restoration is mature, pure IP layer restoration is currently preferred in many IP networks. One major reason for this preference is that the optical layer cannot restore failures at the IP layer; thus, additional IP layer capacity would still be needed for restoring IP layer failures, resulting in no cost advantage compared to pure IP layer restoration.

SUMMARY

In accordance with embodiments of the present disclosure, a method may include sorting potential optical layer link failures in a network in an increasing order of failed traffic amount. The method may further include, for each potential optical link failure in increasing order of failed traffic amount: determining the additional higher layer link capacity required on existing higher layer links associated with the potential optical link failure using higher layer restoration of the potential optical link failure; determining the additional optical layer capacity required for restoring the existing higher layer links associated with the potential optical link failure using optical layer restoration; and selecting one of the higher layer and the optical layer as a restoration layer for restoration of the existing higher layer links associated with the potential optical link failure based on the determined additional higher layer link capacity and the determined additional optical layer capacity.

One or more technical advantages of the present disclosure may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIGS. 3A-3C illustrate block diagrams depicting an example of a hybrid multi-layer mesh restoration scheme compared to pure IP layer restoration, in accordance with embodiments of the present disclosure;

DETAILED DESCRIPTION

Embodiments of the present invention and its advantages are best understood by referring to FIGS. 1-5, like numerals being used for like and corresponding parts of the various drawings.

Figure 1:
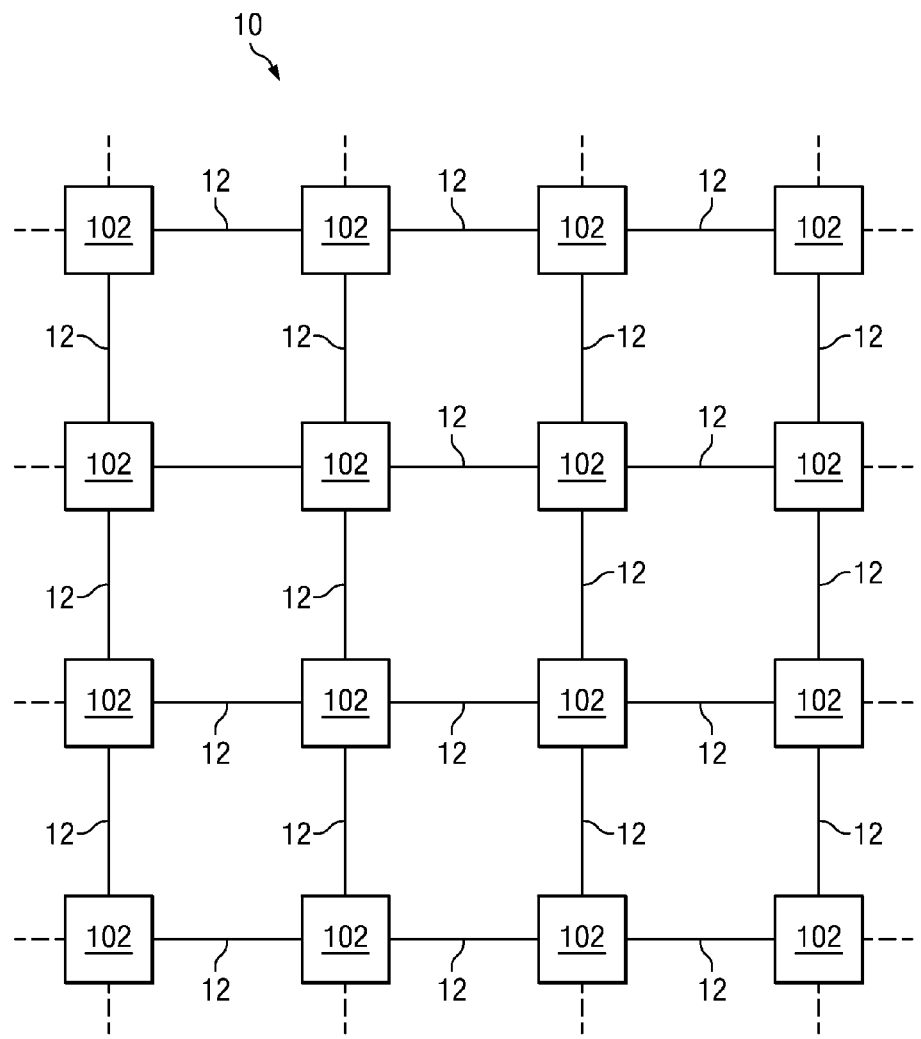
FIG. 1 illustrates a block diagram of an example network, in accordance with embodiments of the present disclosure.

FIG. 1 illustrates a block diagram of an example network 10, in accordance with certain embodiments of the present disclosure. In certain embodiments, network 10 may be an Ethernet network. Network 10 may include one or more links 12 operable to transport one or more signals communicated by components of network 10. The components of network 10, coupled together by links 12, may include a plurality of network elements 102. In the illustrated network 10, each network element 102 is coupled to four other nodes. However, any suitable configuration of any suitable number of network elements 102 may create network 10. Network 10 may be used in a short-haul metropolitan network, a long-haul inter-city network, or any other suitable network or combination of networks.

Each link 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, or other suitable medium.

Network 10 may communicate information or "traffic" over links 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

Figure 2:
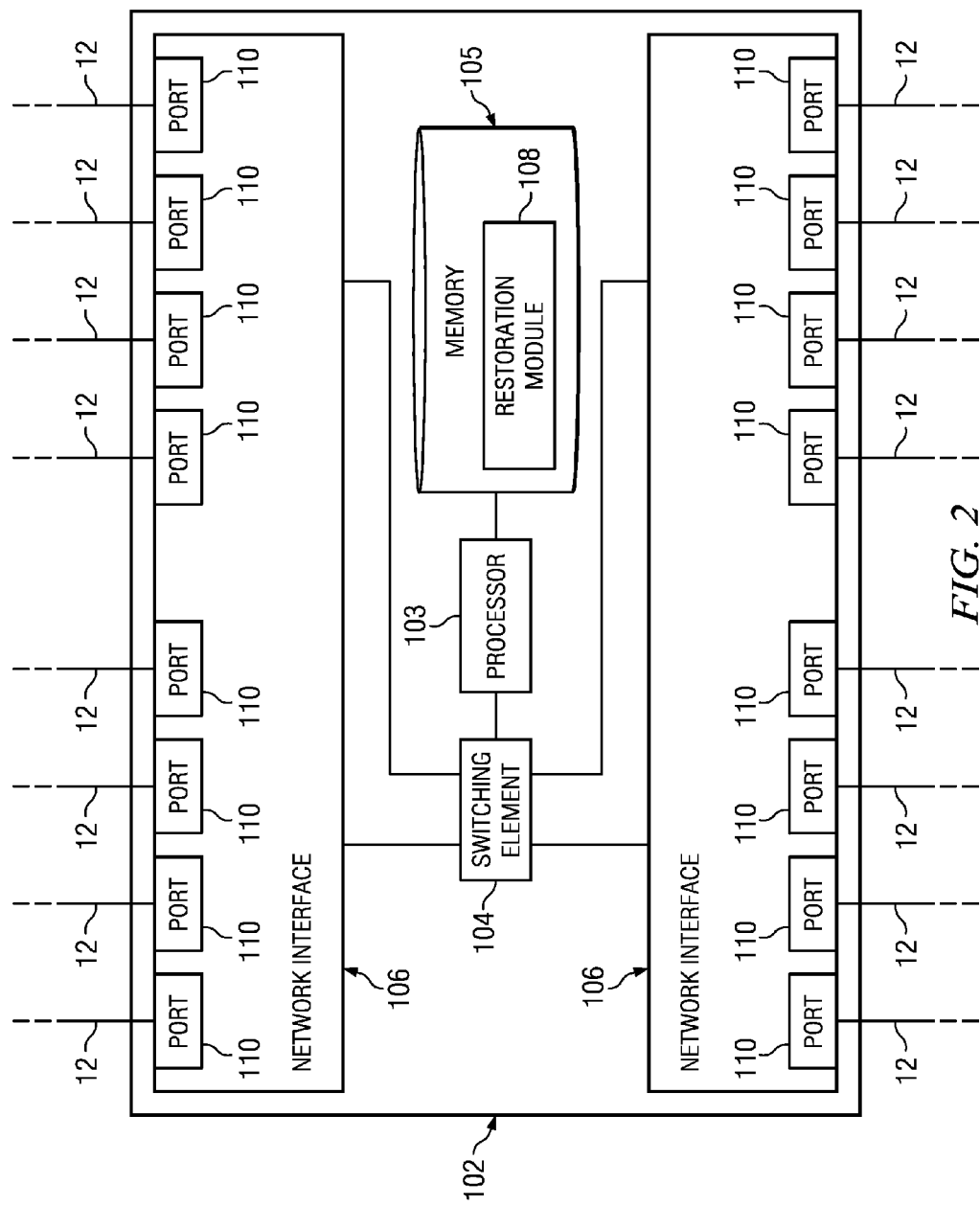
FIG. 2 illustrates a block diagram an example network element, in accordance with embodiments of the present disclosure.

FIG. 2 illustrates a block diagram an example network element 102, in accordance with certain embodiments of the present disclosure. As discussed above, each network element 102 may be coupled to one or more other network elements 102 via one or more links 12. In some embodiments, however, not all network elements 102 may be directly coupled as shown in FIG. 2. Each network element 102 may generally be configured to receive data from and/or transmit data to one or more other network elements 102. In certain embodiments, network element 102 may comprise a switch or router configured to transmit data received by network element 102 to another device (e.g., another network element 102) coupled to network element 102.

As depicted in FIG. 2, network element 102 may include a processor 103, a memory 105, a switching element 104, and one or more network interfaces 106 communicatively coupled to switching element 104.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 105 and/or another component of network element 102. Although FIG. 2 depicts processor 103 as a component independent from network interfaces 106, in some embodiments one or more processors 103 may reside on network interfaces 106 and/or other components of a network element 102.

Memory 105 may be communicatively coupled to processor 103 and may include any system, device, or apparatus configured to retain program instructions and/or data for a period of time (e.g., computer-readable media). Memory 105 may include random access memory (RAM), electrically erasable programmable read-only memory (EEPROM), a PCMCIA card, flash memory, magnetic storage, opto-magnetic storage, or any suitable selection and/or array of volatile or non-volatile memory that may retain data after power to network element 102 is turned off. Although FIG. 2 depicts memory 105 as independent from network interfaces 106, in some embodiments one or more memories 105 may reside on network interfaces 106 and/or other components of network element 102.

As shown in FIG. 2, memory 105 may include a restoration module 108. Restoration module 108 may include any system, device, or apparatus configured to, alone or in combination with restoration modules 108 of other network elements 102, perform hybrid multi-layer restoration, as described in greater detail herein. In some embodiments, restoration module 108 may be embodied in a program of instructions that may be read and executed by processor 103. Although restoration module 108 is depicted as being stored upon memory 105, in some embodiments, restoration module 108 may be implemented in hardware and/or firmware components of network element 102. In addition, although restoration module 108 is depicted as being stored upon memory 105, in some embodiments, restoration module 108 may be an integral component of another component of network element 102 (e.g., restoration module 108 may be integral to a network interface 106, or distributed among network interfaces 106 of a network element 102).

Switching element 104 may include any suitable system, apparatus, or device configured to receive traffic via a network interface and forward such traffic to a particular network interface 106 and/or port 110 based on analyzing the contents of the datagrams carrying the traffic and/or based on a characteristic of a signal carrying the datagrams (e.g., a wavelength and/or modulation of the signal). For example, in certain embodiments, a switching element 104 may include a switch fabric (SWF).

Each network interface 106 may be communicatively coupled to switching element 104 and may include any suitable system, apparatus, or device configured to serve as an interface between a network element 102 and a link 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card. In these and other embodiments, one or more network interfaces may include a network processing unit (NPU). In an embodiment where network 10 is an optical IP network, one or more network interfaces may include an Internet Protocol/Wavelength Division Multiplexing (IP/WDM) line card).

As depicted in FIG. 2, each of network interfaces 106 may include one or more physical ports 110. Each physical port 110 may include any system, device or apparatus configured to serve as a physical interface between a corresponding link 12 and network interface 106. For example, a physical port 110 may comprise an Ethernet port, an optical port, or any other suitable port. In some embodiments, physical ports 110 may be provisioned in a redundancy scheme, such that one or more ports 110 may be designated as "working" or "active" paths for communicating traffic while other ports 110 may be designated as redundant "protection" or "standby" paths which may be employed in the event of a link failure or other failure of a "working" or "active" path. For example, a plurality of ports 110 may be member ports of a link aggregation group in accordance with IEEE standard 802.1AX-2008 or another suitable redundancy scheme.

In operation, one or more restoration modules 108 and/or one or more other components of network elements 102 may be configured to perform a hybrid restoration scheme wherein some paths may be restored at one layer (e.g., the optical layer or Layer 1) while other paths may be restored at another layer (e.g., the IP layer of Layer 3). For example, working traffic may be routed on a given IP network using shortest path routing. Upon each fiber link failure, selected IP links may be restored at the optical layer and the remaining failed traffic may be restored at the IP layer. Network interfaces 106 (e.g., router line cards and/or wavelength-division multiplexing (WDM) line cards (e.g., optical transponders) may be reused at the failed IP links that are optically restored using optical layer technologies. For each router failure, a hybrid approach may be applied. The maximum capacity required among all possible failures may then be provisioned. To perform such hybrid restoration, at least two key issues may need to be addressed: (i) how to reuse router line cards and WDM line cards at the failed IP links, and (ii) how to determine the set of IP links to be restored at the optical layer.

FIGS. 3A-3C illustrate block diagrams depicting an example of a hybrid multi-layer mesh restoration scheme compared to pure IP layer restoration, in accordance with embodiments of the present disclosure. FIG. 3A depicts an IP/WDM network comprising network elements 102 labeled A, B, C, D, and E, wherein a single fiber link failure at (C, D) (e.g., a failure of a link 12 between network elements 102 labeled C and D) causes two IP link failures: (C, D) and (A, D). As shown in the example of FIG. 3A, the IP links between the various network elements may be of any suitable transmission rate. For the purposes of this example, it is assumed that router line cards and WDM line cards operate at a rate of 40 Gbps.

FIG. 3B depicts a restoration approach in which three additional IP/WDM links are needed if pure IP layer restoration is used. On the other hand, FIG. 3C depicts a restoration approach in which a hybrid mesh restoration scheme is used. In such hybrid scheme, IP link (C, D) may be optically restored by establishing an optical layer path C-B-D (the curved line) that is disjoint from its working path C-D, such that no topology change occurs at the IP layer. In addition, traffic on IP link (A, D) may be restored at the IP layer with an alternate IP layer path A-C-D (shown by a dotted line traversing the path A-C-D). On IP link (C, D), both router line cards and WDM line cards may be reused. Thus, no additional line card or other network interface may be required for restoration. However, additional WDM layer resources, such as optical regenerators, may be needed as the optical restoration path may be longer than its corresponding working path.

Figure 4A:
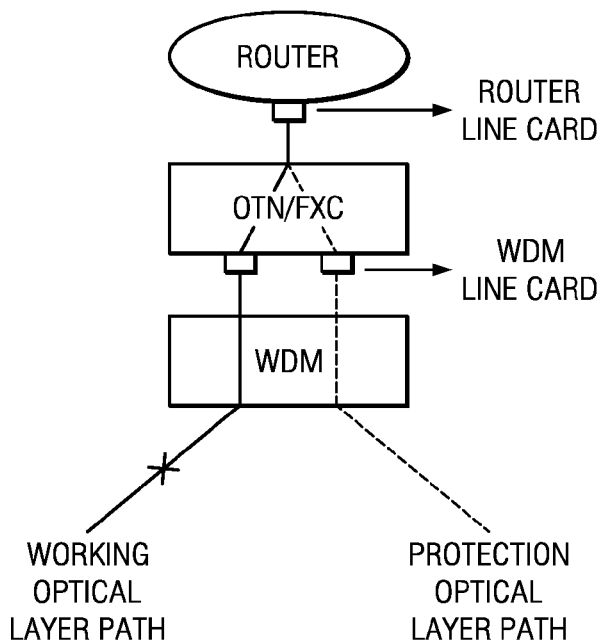
FIGS. 4A and 4B illustrate reconfigurable optical layer technologies which may be used to facilitate reuse of network interfaces (e.g., router line cards and WDM line cards) at failed IP links, in accordance with the present disclosure.
Figure 4B:
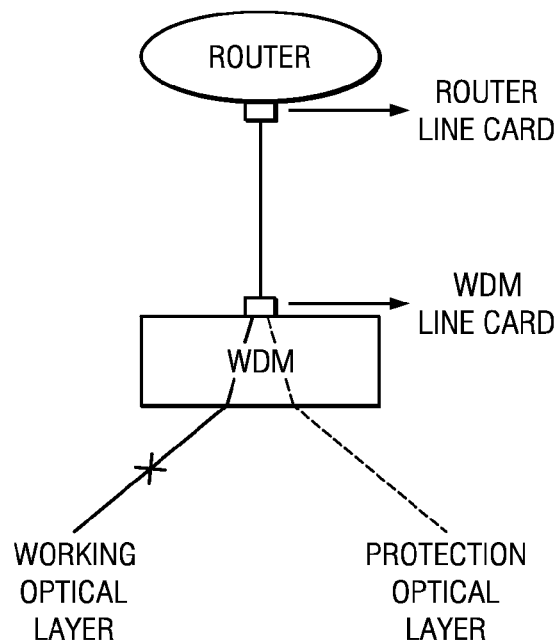

FIGS. 4A and 4B illustrate reconfigurable optical layer technologies which may be used to facilitate reuse of network interfaces (e.g., router line cards and WDM line cards) at failed IP links, in accordance with the present disclosure. Such reconfigurable optical layer technologies may include, without limitation, fiber cross connects (FXC), optical transport networks (OTN), or next-generation reconfigurable add-drop multiplexers (NG-ROADM) that are colorless and non-directional. As shown in FIG. 4A, router line cards may be reused if classic reconfigurable add-drop multiplexers (ROADMs), together with FXC or OTN technology, are used. In such an architecture, an additional WDM line card may be needed in order to redirect the failed IP link from the working path to the disjoint restoration path at the optical layer. As depicted in FIG. 4B, both router line cards and WDM line cards may be reused with a NG-ROADM, and no additional line card may be needed for restoration at the optical layer.

Figure 5:
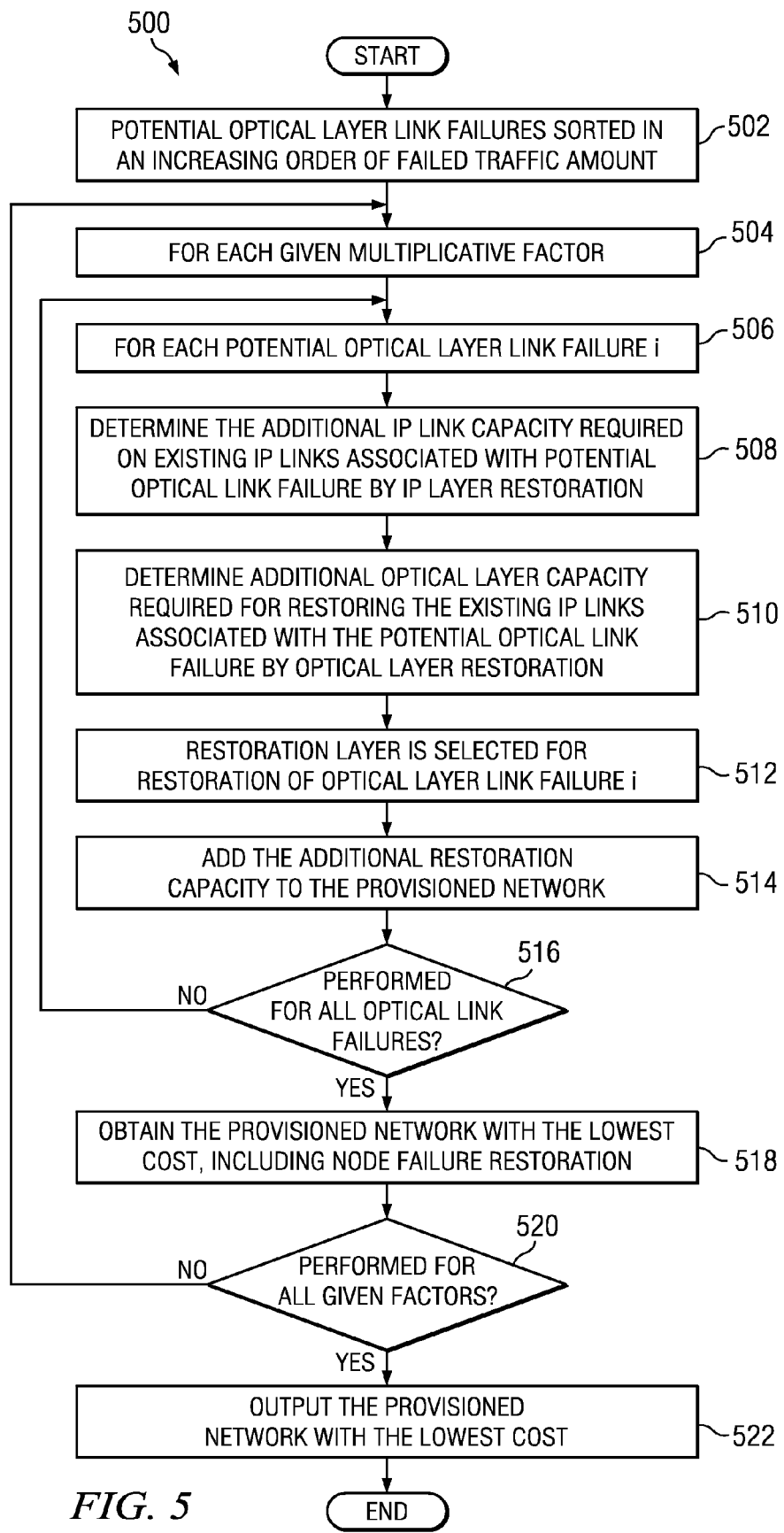
FIG. 5 illustrates a flow chart of an example method for hybrid multi-layer mesh restoration, in accordance with embodiments of the present disclosure.

FIG. 5 illustrates a flow chart of an example method 500 for hybrid multi-layer mesh restoration, in accordance with embodiments of the present disclosure. Method 500 may be performed by one or more of restoration modules 108, and/or one or more other components of network elements 102. According to one embodiment, method 500 may begin at step 502. As noted above, teachings of the present disclosure may be implemented in a variety of configurations of network 10. As such, the preferred initialization point for method 500 and the order of the steps 502-522 comprising method 500 may depend on the implementation chosen.

At step 502, potential optical layer link failures may first be sorted in an increasing order of failed traffic amount. For example, in the example of FIG. 3A, optical link (C, D) may carry traffic of 40 Gbps, whereas optical link (B, D) may carry traffic of 120 Gbps. Thus, when potential optical layer link failures are sorted in increasing order, optical link (C, D) may be sorted ahead of optical link (B, D).

As indicated at block 504, steps 506-520 may be performed for each of a given multiplicative factor. The multiplicative factor may be a factor selected to normalize costs associated with IP layer restoration with costs associated with optical layer restoration (e.g., IP layer components may be more expensive to implement, and accordingly the multiplicative factor may have a value accounting for the relative cost between IP layer components and optical layer components). Although the relative cost between IP layer components and optical layer components may be fixed, the multiplicative factor can be a range of values approximate to the relative cost because an approach for estimating the cost may be coarse and does not consider node failures. As an example, if the multiplicative factor is higher, more IP links will be selected to be restored at the optical layer, thus fewer router line cards needed for optical layer link failures. However, this will result in more router line cards needed for restoring router node failures, since fewer router line cards for optical layer link failures are able to be reused for router node failures. Depending on the given factor, the set of IP links that are selected to be restored at the optical layer may be different.

As indicated at block 506, steps 508-516 may be performed for each potential optical layer link failure i, in order of the sorted potential optical layer link failures (e.g., from step 502).

At step 508, for each potential optical layer link failure i, the additional IP link capacity required on existing IP links associated with the potential optical layer link failure for IP layer restoration may be determined, taking into account spare IP capacity that can be from the unused IP layer capacity on the working IP links, or from the restoration capacity on existing IP links.

At step 510, the additional optical layer capacity needed for restoring the existing IP links associated with the potential IP link failure i at the optical layer is then determined. At step 512, a restoration layer (e.g., the optical layer or the IP layer) is selected for restoration of the potential optical layer link failure. The selection of the layer for restoration may be based on a comparison of: (i) the multiplicative factor multiplied by the quantity of the number IP links for IP layer restoration plus the number of optical regenerators associated with the IP links to be used for IP layer restoration (factor×(IP links+ regenerators for IP layer restoration)), and (ii) the number of optical links for optical layer restoration plus the number of optical regenerators associated with the optical links to be used for optical layer restoration (optical links+regenerators for optical layer restoration). If (i) is smaller than (ii), the failed IP links associated with the optical layer link failure may be selected for restoration at the IP layer. Otherwise, the failed IP links associated with the optical link failure may be selected for restoration at the optical layer. At step 514, additional restoration capacity for all potential router node failures may be added to the network. The additional restoration capacity may be added for restoring a single optical layer for a link failure, and the network restoration capacity may be incrementally updated after each potential failure is evaluated.

At 516, a determination may be made regarding whether steps 508-514 have been performed for all potential optical layer link failures. If steps 508-514 have been performed for all potential optical layer link failures, method 500 may proceed to step 518. Otherwise, method 500 may proceed again to step 506. At step 518, in response to a determination that steps 508-514 have been performed for all potential optical layer link failures, a provisioned network considering all potential optical link failures, including node failure restoration, may be obtained. In some embodiments, provisioning of capacity for node failures may be performed separately from provisioning of capacity for node failures. In such embodiments, provisioning capacity for node failures may be performed at step 518.

At step 520, a determination may be made regarding whether steps 506-518 have been performed for all given multiplicative factors. If steps 508-514 have been performed for all given multiplicative factors, method 500 may proceed to step 522. Otherwise, method 500 may proceed again to step 504. At step 522, in response to a determination that steps 506-518 have been performed for all given multiplicative factors, the provisioned network with the lowest cost across all given multiplicative factors and potential optical link failures may be determined. After completion of step 522, method 500 may end.

In accordance with method 500, the set of restored IP links that results in the lowest restoration cost for the given optical layer link failure may be chosen.

Although FIG. 5 discloses a particular number of steps to be taken with respect to method 500, method 500 may be executed with greater or lesser steps than those depicted in FIG. 5. In addition, although FIG. 5 discloses a certain order of steps to be taken with respect to method 500, the steps comprising method 500 may be completed in any suitable order.

Method 500 may be implemented using network 10 or any other system operable to implement method 500. In certain embodiments, method 500 may be implemented partially or fully in software and/or firmware embodied in computer-readable media.

The foregoing discussion considers methods and systems for selecting between IP layer restoration and optical layer network restoration. However, such methods and systems may also be applied to selection between restoration at a layer higher than the IP layer (e.g., Layer 4, Layer 5, Layer 6, Layer 7, etc.) and at a layer higher than optical layer network restoration (e.g., optical transport network (OTN) layer)).

A component of network 10 and/or a network element 102 may include an interface, logic, memory, and/or other suitable element. An interface receives input, sends output, processes the input and/or output, and/or performs other suitable operations. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 and/or a network element 102 without departing from the scope of the invention. The components of network 10 and/or network element 102 may be integrated or separated. Moreover, the operations of network 10 and/or network element 102 may be performed by more, fewer, or other components. Additionally, operations of network 10 and/or a network element 102 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   sorting potential optical layer link failures in a network in an increasing order of failed traffic amount;
   for each potential optical link failure in increasing order of failed traffic amount:
   determining an additional higher layer link capacity required on existing higher layer links associated with the potential optical link failure using higher layer restoration of the potential optical link failure;
   determining an additional optical layer capacity required for restoring the existing higher layer links associated with the potential optical link failure using optical layer restoration; and
   selecting one of the higher layer and the optical layer as a restoration layer for restoration of the existing higher layer links associated with the potential optical link failure based on the determined additional higher layer link capacity and the determined additional optical layer capacity.

2. A method according to claim 1, wherein determining the additional higher layer link capacity required comprises taking into account spare higher layer capacity from the unused higher layer capacity on working higher layer links of the network.

3. A method according to claim 1, wherein determining the additional higher layer link capacity required comprises taking into account the restoration capacity on the existing higher layer links.

4. A method according to claim 1, wherein selecting the restoration layer comprises:
   comparing a first amount to a second amount, wherein:
      the first amount equals a multiplicative factor multiplied by the quantity of a number higher layer links for higher layer restoration plus a number of optical regenerators associated with the higher layer links to be used for higher layer restoration; and
      the second amount equals a number of optical links for optical layer restoration plus a number of optical regenerators associated with the optical links to be used for optical layer restoration; and
   selecting the higher layer as the restoration layer if the first amount is less than the second amount; and
   selecting the optical layer as the restoration later if the first amount is not less than the second amount.

5. A method according to claim 4, wherein the multiplicative factor is a factor selected to normalize costs associated with higher layer restoration with costs associated with optical layer restoration.

6. A method according to claim 1, wherein the higher layer is an Internet protocol layer.

7. A method according to claim 1, wherein the higher layer is a layer of Layer 3 or higher.

8. A network element comprising:
   a processor; and
   a resource allocation module communicatively coupled to the processor and configured to, either individually or in concert with one or more other resource allocation modules integral to one or more other network elements:
      sort potential optical layer link failures in a network in an increasing order of failed traffic amount;
      for each potential optical link failure in increasing order of failed traffic amount:
         determine an additional higher layer link capacity required on existing higher links associated with the potential optical link failure using higher layer restoration of the potential optical link failure;
         determine an additional optical layer capacity required for restoring the existing higher layer links associated with the potential optical link failure using optical layer restoration; and
         select one of the higher layer and the optical layer as a restoration layer for restoration of the existing higher layer links associated with the potential optical link failure based on the determined additional higher layer link capacity and the determined additional optical layer capacity.

9. A network element according to claim 8, wherein determining the additional higher layer link capacity required comprises taking into account spare higher layer capacity from the unused higher layer capacity on working higher layer links of the network.

10. A network element according to claim 8, wherein determining the additional higher layer link capacity required comprises taking into account the restoration capacity on the existing higher layer links.

11. A network element according to claim 8, wherein selecting the restoration layer comprises:
    comparing a first amount to a second amount, wherein:
       the first amount equals a multiplicative factor multiplied by the quantity of a number higher layer links for higher layer restoration plus a number of optical regenerators associated with the higher layer links to be used for higher layer restoration; and
       the second amount equals a number of optical links for optical layer restoration plus a number of optical regenerators associated with the optical links to be used for optical layer restoration; and
    selecting the higher layer as the restoration layer if the first amount is less than the second amount; and
    selecting the optical layer as the restoration later if the first amount is not less than the second amount.

12. A network element according to claim 11, wherein the multiplicative factor is a factor selected to normalize costs associated with higher layer restoration with costs associated with optical layer restoration.

13. A network element according to claim 8, wherein the higher layer is an Internet protocol layer.

14. A network element according to claim 8, wherein the higher layer is a layer of Layer 3 or higher.

15. An article of manufacture, comprising:
    a computer readable medium;
    computer-executable instructions carried on the computer readable medium, the instructions readable by a processor, the instructions, when read and executed, for causing the processor to:
       sort potential optical layer link failures in a network in an increasing order of failed traffic amount;
       for each potential optical link failure in increasing order of failed traffic amount:
          determine an additional higher layer link capacity required on existing higher layer links associated with the potential optical link failure using higher layer restoration of the potential optical link failure;
          determine an additional optical layer capacity required for restoring the existing higher layer links associated with the potential optical link failure using optical layer restoration; and
          select one of the higher layer and the optical layer as a restoration layer for restoration of the existing higher layer links associated with the potential optical link failure based on the determined additional higher layer link capacity and the determined additional optical layer capacity.

16. An article of manufacture according to claim 15, wherein determining the additional higher layer link capacity required comprises taking into account spare higher layer capacity from the unused higher layer capacity on working higher layer links of the network.

17. An article of manufacture according to claim 15, wherein determining the additional higher layer link capacity required comprises taking into account the restoration capacity on the existing higher layer links.

18. An article of manufacture according to claim 15, wherein selecting the restoration layer comprises:
    comparing a first amount to a second amount, wherein:
       the first amount equals a multiplicative factor multiplied by the quantity of a number higher layer links for higher layer restoration plus a number of optical regenerators associated with the higher layer links to be used for higher layer restoration; and the second amount equals a number of optical links for optical layer restoration plus a number of optical regenerators associated with the optical links to be used for optical layer restoration; and selecting the higher layer as the restoration layer if the first amount is less than the second amount; and selecting the optical layer as the restoration later if the first amount is not less than the second amount.

19. An article of manufacture according to claim 18, wherein the multiplicative factor is a factor selected to normalize costs associated with higher layer restoration with costs associated with optical layer restoration.

20. An article of manufacture according to claim 15, wherein the higher layer is an Internet protocol layer.

21. An article of manufacture according to claim 15, wherein the higher layer is a layer of Layer 3 or higher.

* * * * *